(12) United States Patent
Gurtu et al.

(10) Patent No.: US 11,997,125 B2
(45) Date of Patent: May 28, 2024

(54) AUTOMATED ACTIONS IN A SECURITY PLATFORM

(71) Applicant: STRIKEREADY, Fremont, CA (US)

(72) Inventors: Anurag Gurtu, Fremont, CA (US); Yasir Khalid, Fremont, CA (US)

(73) Assignee: STRIKEREADY INC., Fremont, CA (US)

( * ) Notice: Subject to any disclaimer, the term of this patent is extended or adjusted under 35 U.S.C. 154(b) by 0 days.

(21) Appl. No.: 16/989,632

(22) Filed: Aug. 10, 2020

(65) Prior Publication Data

US 2021/0266341 A1 Aug. 26, 2021

Related U.S. Application Data

(60) Provisional application No. 62/980,519, filed on Feb. 24, 2020.

(51) Int. Cl.
*H04L 29/06* (2006.01)
*G06N 5/025* (2023.01)
(Continued)

(52) U.S. Cl.
CPC ......... *H04L 63/1433* (2013.01); *G06N 5/025* (2013.01); *H04L 63/102* (2013.01); *H04L 67/535* (2022.05)

(58) Field of Classification Search
CPC .. G06F 11/3438; G06F 21/577; G06F 40/242; G06F 40/295; G06F 40/284; G06F 11/328; G06F 21/6218; G06F 21/554; H04L 63/20; H04L 63/1433; H04L 63/1425; H04L 41/22; H04L 43/00; H04L 63/145; H04L 63/1441; H04L 63/1458;
(Continued)

(56) References Cited

U.S. PATENT DOCUMENTS 9,355,013 B1 * 5/2016 Adams ............... G06Q 10/10
9,516,053 B1 * 12/2016 Muddu ............... H04L 43/00
(Continued)

FOREIGN PATENT DOCUMENTS

WO 2015051181 A1 4/2015

OTHER PUBLICATIONS

Luigi Coppolino et al., "A framework for mastering heterogeneity in multi-layer security information and event correlation", In: Journal of Systems Architecture, vol. 62, pp. 78-88, Jan. 2016 sections 1-5.2; table 1; figures 2-3.
(Continued)

*Primary Examiner* — Dustin Nguyen
(74) *Attorney, Agent, or Firm* — Womble Bond Dickinson (US) LLP (57) ABSTRACT

Systems and methods for providing automated actions in handling security threats are disclosed. The method includes receiving input data comprising one or more entities and one or more intents. The method further includes extracting the entities and the intents from the input data. In response to determining that there exists at least one actionable entity from the extracted entities, the method further includes presenting a plurality of available security actions to a user to resolve one or more security threats associated with the input data, the available security actions being respectively selectable by the user.

16 Claims, 10 Drawing Sheets

(51) Int. Cl.
  *H04L 9/40* (2022.01)
  *H04L 67/50* (2022.01)
(58) Field of Classification Search
  CPC .......... G06N 20/20; G06N 5/04; G06N 20/00; G06Q 10/10
  See application file for complete search history.

(56) References Cited

U.S. PATENT DOCUMENTS

| | | | | |
|---|---|---|---|---|
| 10,341,377 | B1* | 7/2019 | Dell'Amico | G06N 20/20 |
| 10,418,036 | B1* | 9/2019 | Roturier | G06F 40/295 |
| 10,599,767 | B1* | 3/2020 | Mattera | G06F 40/242 |
| 10,673,880 | B1* | 6/2020 | Pratt | H04L 63/1425 |
| 10,944,758 | B1* | 3/2021 | Nagargadde | G06F 21/6218 |
| 2009/0192962 | A1* | 7/2009 | Rigdon | G06N 5/04 706/46 |
| 2011/0126111 | A1* | 5/2011 | Gill | G06F 21/577 715/736 |
| 2013/0061169 | A1* | 3/2013 | Pearcy | G06F 11/328 715/788 |
| 2013/0247191 | A1* | 9/2013 | Balasubramanian | H04L 63/145 709/206 |
| 2014/0283049 | A1* | 9/2014 | Shnowske | H04L 63/1441 726/23 |
| 2017/0063902 | A1* | 3/2017 | Muddu | H04L 41/22 |
| 2017/0155683 | A1* | 6/2017 | Singla | H04L 63/1441 |
| 2017/0171235 | A1* | 6/2017 | Mulchandani | H04L 63/1433 |
| 2017/0243008 | A1 | 8/2017 | Cornell et al. | |
| 2017/0310692 | A1* | 10/2017 | Ackerman | H04L 63/1458 |
| 2018/0004942 | A1* | 1/2018 | Martin | G06F 21/554 |
| 2018/0124098 | A1* | 5/2018 | Carver | G06N 20/00 |
| 2018/0152480 | A1* | 5/2018 | Kinder | H04L 63/1433 |
| 2019/0020669 | A1 | 1/2019 | Glatfelter et al. | |
| 2019/0132264 | A1* | 5/2019 | Jafar Ali | G06F 40/295 |
| 2019/0268354 | A1* | 8/2019 | Zettel, II | H04L 63/20 |
| 2019/0356682 | A1 | 11/2019 | Hadden et al. | |
| 2020/0014711 | A1* | 1/2020 | Rego | H04L 63/1433 |
| 2020/0175077 | A1* | 6/2020 | Sharan | G06F 11/3438 |
| 2020/0204572 | A1* | 6/2020 | Jeyakumar | H04L 63/145 |
| 2020/0382359 | A1* | 12/2020 | Rao | G06F 40/284 |
| 2021/0234889 | A1* | 7/2021 | Burle | H04L 63/1433 |

OTHER PUBLICATIONS

International Search Report and Written Opinion on the Patentability of Application No. PCT/US2021/019280 dated Jun. 14, 2021, 19 pages.
International Preliminary Report and Written Opinion on the Patentability of Application No. PCT/US2021/019280 dated Sep. 9, 2022, 6 pages.

* cited by examiner

AUTOMATED ACTIONS IN A SECURITY PLATFORM

RELATED APPLICATION

The present application claims the benefit under 35 USC 119(e) of U.S. Provisional Patent Application No. 62/980,519, filed on Feb. 24, 2020 and entitled "CYBER SITUATIONAL AWARENESS AND RESPONSE CONVERSATIONAL/VIRTUAL ASSISTANT", which is incorporated by reference in its entirety.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

TECHNICAL FIELD

Embodiments of the present invention relate generally to cyber security (network, end-point and cloud). More particularly, embodiments of the invention relate to a system, apparatus, and method that offers automated actions to help organizations safeguard against active and in-the-wild attacks to accelerate incident response through an interactive user interface.

BACKGROUND

In the world of cyber-security, there is a massive shortage of cyber-security professionals and there is a huge gap in their skill set. This serious shortage of talent and skill gaps can cost companies hundreds of millions of dollars. In fact, the cyber-security workforce must grow about 145% in order to close the talent gap. That is, by 2022 about four million cyber-security professionals would need to be employed to close this gap, though there is no realistic time table to hire such a large amount of people. To compensate for this gap, every organization keeps purchasing security products (e.g., threat prevention, detection, response and automation technology) and implements security processes to operate in conjunction with its security professionals, but still get breached.

Unfortunately, conventional security automation products are static and inflexible in nature. That is, those security automation products require a user (e.g., a security analyst) to manually construct and customize playbooks, such as flow diagrams that include a number of static decision blocks. Such flow diagrams cannot be dynamically updated, and therefore, user intervention is required when there exists a new security technology or a new security use case. Moreover, the conventional security automation products lack the ad hoc capability or human-to-machine interaction. They require highly skilled security analysts to implement and operate, which does not help bridge the gap in the shortage of security experts.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect, a method and apparatus for providing automated actions in handling security threats are described. In one embodiment, the method includes receiving input data (e.g., a ticket, incident, alert, event, user input via text or voice, etc.) comprising one or more entities and one or more intents. In one embodiment, the input data may be provided by a user through a graphical user interface. The method may further include extracting the entities and the intents from the input data. In response to determining that there exists at least one actionable entity from the extracted entities, the method further includes presenting a plurality of available security actions to the user to resolve one or more security threats associated with the input data, the available security actions being respectively selectable by the user.

In one embodiment, in response to selecting an available security action by the user, the method further includes invoking a security technology or product to resolve the security threats. The method may further include dynamically updating the presented available security actions based on filter actions. The method may further include disabling some of the available security actions based on the user's role, where the disabled security actions are preset (e.g., by a security administrator) to be inaccessible to the user. The method may further include disabling some of the available security actions based on a predictive model trained with the user's historical behavior in selecting past security actions to resolve prior input data. In response to determining that there is no actionable entity from the extracted entities, the method may include performing a knowledge-based action or an analytics-based action. In one embodiment, the plurality of available security actions comprise at least one of: available actions, possible actions, or probable actions. In one embodiment, the method includes presenting to the user corresponding confidence scores associated with the plurality of available security actions, where the corresponding confidence scores provide the user with a range of actions indicating from a mostly selected security action to a least selected security action. In one embodiment, the plurality of available security actions are performed by security technologies or products that are enabled under integration (e.g., under an "Integration" tab in a graphical user interface).

Figure 1:
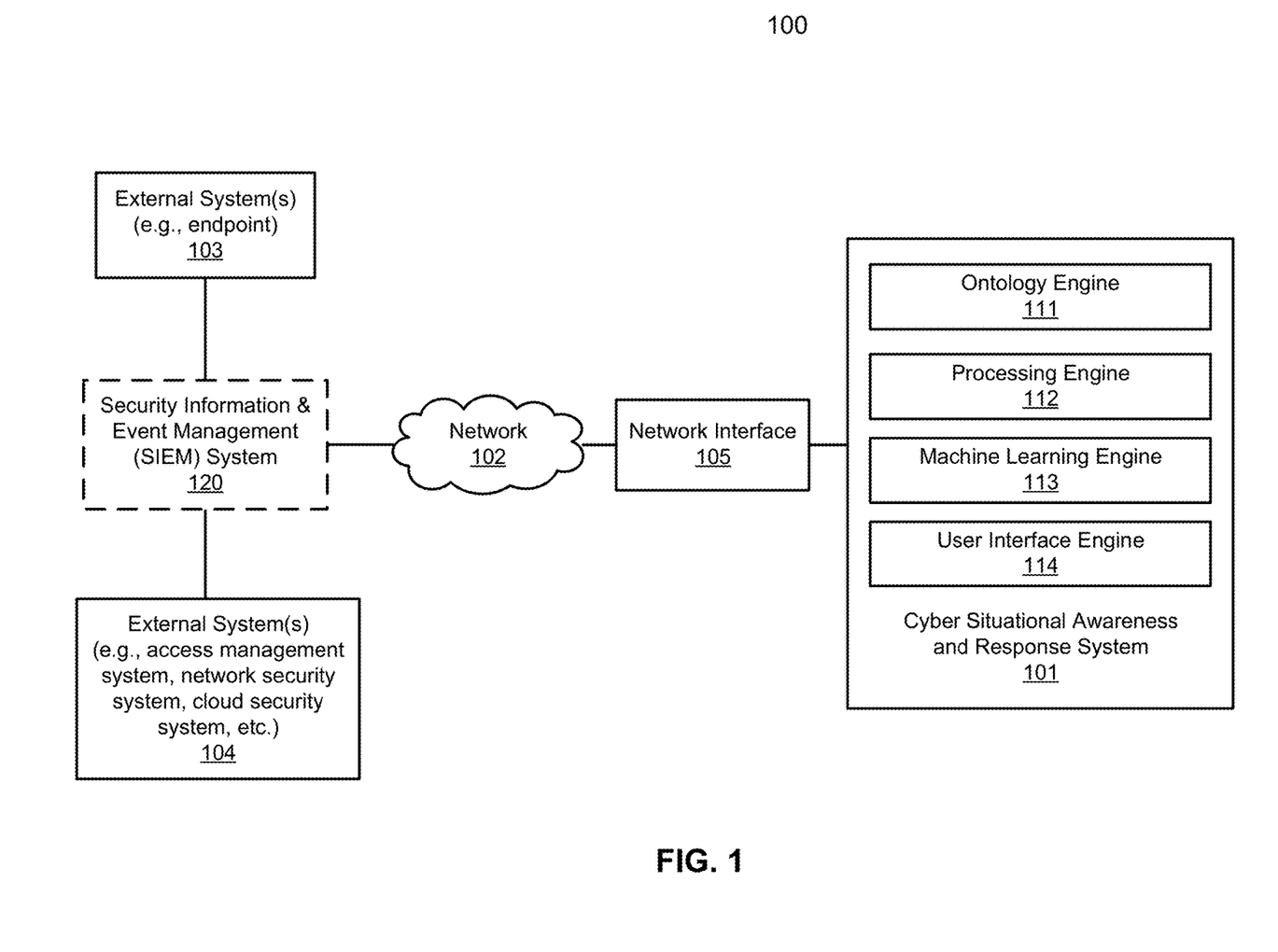
FIG. 1 is a block diagram illustrating a software and network system according to one embodiment.

FIG. 1 is a block diagram illustrating a network system according to one embodiment of the invention. Referring to FIG. 1, software and network system 100 includes a cyber situational awareness and response system 101 that may be communicatively coupled to a security information and event management (SIEM) system 120 over network 102. Network 102 may be any type of networks such as a local area network (LAN), a wide area network (WAN) such as the Internet, a fiber network, a storage network, or a combination thereof, wired or wireless.

As shown, SIEM system 120 may be communicatively coupled to one or more external systems 103-104 to collect log and event data generated by system(s) 103-104, aggregate the log, alert and/or event data, and/or analyze the log, alert and/or event data in real-time or batch-mode in order to provide threating monitoring, event/alert correlation and incident response. External system(s) 103-104 may be any kind of systems, such as endpoints (e.g., laptops, desktops, mobile phones, tablets, virtual environments, Internet of Things (IoT) devices, etc.), access management systems (e.g., SIEM and user behavior analytics (UBA) systems, vulnerability management system, sandbox system, email security system, incident management system, etc.), network systems (e.g., routers, firewalls, switches, etc.), cloud security systems (e.g., any type of servers or a cluster of one or more servers (e.g., cloud servers)), etc.

In one embodiment, cyber situational awareness and response system 101 may be communicatively coupled with network 102 via network interface 105 (e.g., a network router, switch, hub, etc.). Network interface 105 may operate as a data capturing device that is configured to receive data propagating to/from SIEM system 120 and provide at least some of the data to system 101.

Cyber Situational Awareness and Response system 101 may be adapted to perform a number of actions responsive to user inputs. That is, system 101 can be seen as a digital assistant—virtual and conversational assistant in security that works with a user (e.g., a cyber-security professional) to resolve or assist with security threats or answer questions centered around security products, trends, news, etc., or works entirely autonomously without requiring user's input. As shown in FIG. 1, system 101 includes an ontology engine 111, processing engine 112, machine learning engine 113, and user interface engine 114. Ontology engine 111 may be configured to receive an input from a user (e.g., a question or command in the form of a sentence or a paragraph), and extract one or many entities (e.g., a noun or nouns or pronoun(s) in the sentence or paragraph) and one or many intents (e.g., a verb—an action or multiple actions to be performed) from the user input.

Based on the extracted entit(ies) and intent(s), processing engine 112 is invoked to perform a particular function accordingly. The function may be a knowledge-based action (such as providing information (e.g., cyber security information, etc.) requested by a user), a contextual awareness action (such as organization has been seen alerts or incidents for a specific attack or organizations similar to its kind are being targeted by specific attacks), or automation-based action (e.g., simulate attack or analyze an alert/IP/domain/object, etc.).

Using the user inputs, machine learning engine 113 generates responses using analytics and trains itself via algorithms and/or predictive models 222 (e.g., deep learning architectures such as, for example, but not limited to, one or more of deep neural networks, convolutional deep neural networks, deep belief networks, recurrent neural networks, etc.) to learn and determine the behavior of the user. In addition, machine learning engine 113 may train a set of rules, algorithms, and/or predictive models with skills for responding to or handling security threats, alerts or knowledge.

User interface engine 114 is configured to allow a user to interact with cyber awareness and response system 101 via peripheral devices, for example, a keyboard, a touch screen display device, a microphone, a speaker, etc. Although not shown in FIG. 1, in some embodiments, cyber awareness and response system 101 may also include an application programming interface (API) to allow applications and services to communicate with system 101 without an interactive interface (e.g., graphical user interface (GUI), web browser, etc.). That is, those applications and services may communicate with system 101 (e.g., sending commands and receiving responses) via API calls and API responses such as messaging and collaboration technologies.

Figure 2:
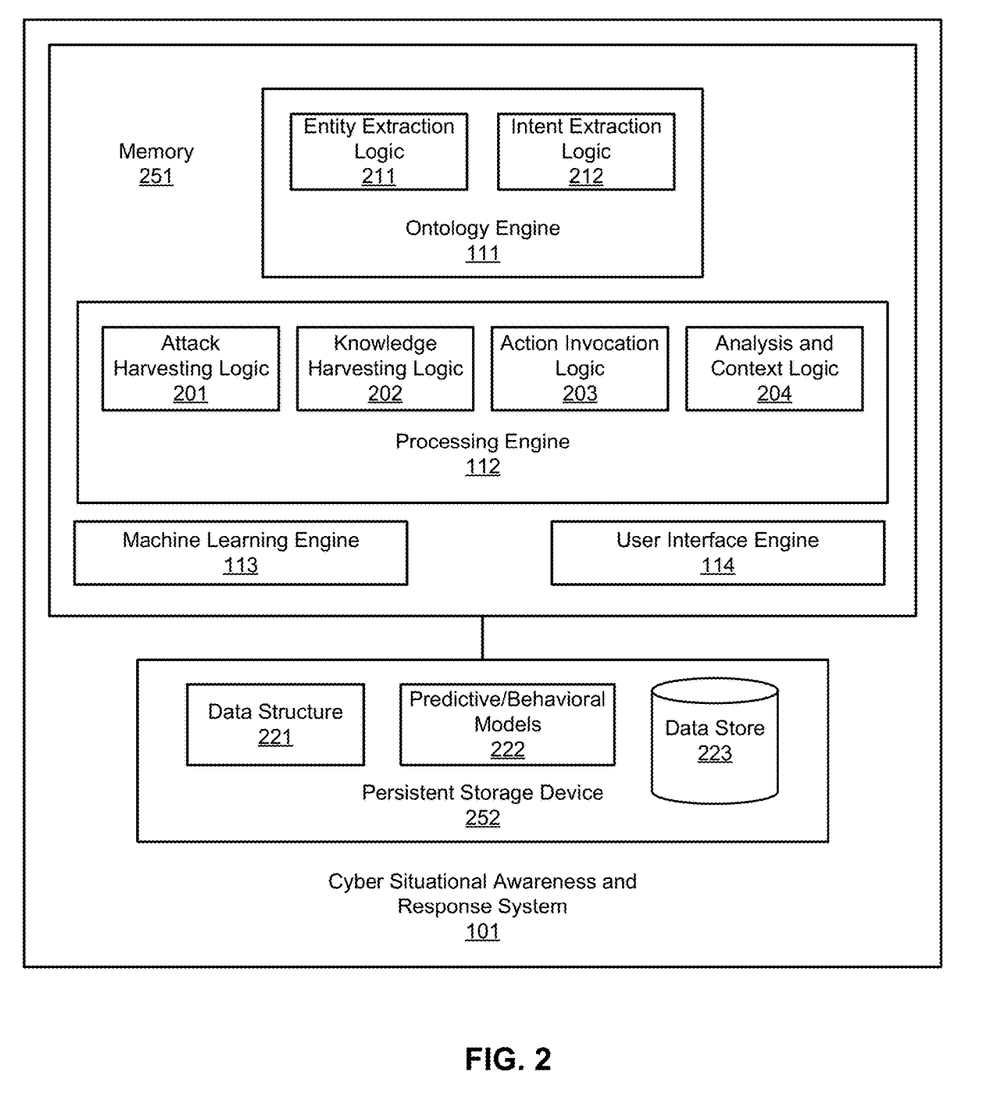
FIG. 2 is block diagram illustrating an example cyber situational awareness and response system according to one embodiment.

FIG. 2 is a block diagram illustrating an example of a cyber situational awareness and response system according to one embodiment. Referring to FIG. 2, cyber situational awareness and response system 101 includes, but is not limited to, ontology engine 111, processing engine 112, machine learning engine 113 and user interface engine 114.

Some or all of modules 111-114 may be implemented in software, hardware, or a combination thereof. For example, these modules may be installed in persistent storage device 252, loaded into memory 251, and executed by one or more processors (not shown). Note that some or all of these modules may be communicatively coupled to or integrated with some or all modules of cyber situational awareness and response system 101. Some of modules 111-114 may be integrated together as an integrated module.

Ontology engine 111 may include an entity extraction logic 211 and an intent extraction logic 212. Ontology engine 111 may receive a user input via user interface engine 114 and passes the user input to entity extraction logic 211 and intent extraction logic 212. Entity extraction logic 211 is configured to extract entities and intent extraction logic 212 is configured to extract intents from the user input. For example, the input can be a knowledge-seeking question that initiates a security-centric conversation (such as "What is Ransomware?", "Who is APT32?", etc.), a contextual awareness question for business insight (such as "What's new to know?", "Am I at risk from Ransomware?", etc.), or an automation-based command for incident response and proactive operation (such as "Check this email for phishing", "Assess my risk against Emotet", etc.).

Entity extraction logic 211 may parse the user input to extract a noun or a pro-noun, which may be predetermined as an entity, from the sentence or paragraph. In the examples of a knowledge-seeking question described above, the entity would be "Ransomware" and "APT32". Intent extraction logic 212 may also parse the user input to extract a verb from the sentence or paragraph. An intent may represent an action to be performed by system 101 and it can be classified into different types, for example knowledge, contextual awareness, and automation. In the examples of a contextual awareness question described above, the phrase "What's new to know" or "at risk" may be determined by logic 212 as a contextual awareness intent. Using the incoming user inputs (e.g., entities and intents), machine learning 113 may train predictive or behavior models (e.g., deep learning architectures such as deep neural networks, convolutional deep neural networks, deep belief networks and/or recurrent neural networks) to learn the behavior of each user.

Based on the extracted entity and intent from the user input, data structure 221 can be traversed to determine if there exists a connection between the extracted entity and intent. In response to determining that there exists such connection, at least one of logics 201-204 (described in more detail herein below) is automatically invoked. That is, the connection between the extracted entity and intent can be seen as a connector that automatically triggers the invocation of at least one of the logics 201-204. In one embodiment, data structure 221 may be a pre-built graph ontology having a set of entity nodes (or vertices) and a set of intent nodes interconnected by a set of edges. The data structure 221 can continuously grow and add nodes (e.g., entities and intents and the relationship between them).

With continued reference to FIG. 2, processing engine 112 includes attack harvesting logic 201, knowledge harvesting logic 202, action invocation logic 203, and analysis and context logic 204. Attack harvesting logic 201 may collect or harvest information regarding security attacks (e.g. attacks currently active in a particular industry or sector, such as financial or banking industry, oil & gas industry, etc.) and respond back to the user with this information provided it is applicable to the user. In attempts to collecting such information, attack harvesting logic 201 may leverage cyber-security defense technologies, such as honeypot, deception, spam bot, lurker bot etc.

In one embodiment, knowledge harvesting logic 202 may collect and analyze security-related information obtained over the Internet or generated by their own threat research team. For example, knowledge harvesting logic 202 may invoke a web crawler to continuously browse the World Wide Web in order to consume security-related information, such as, for example, types of threats, severity of the threats, how the threats can be detected and resolved, etc. The information collected by attack harvesting logic 201 and knowledge harvesting logic 202 may be aggregated and stored in data store 223 (e.g., relational or non-relational database) to build a map and graph infrastructure for subsequent use.

In one embodiment, action invocation logic 203 may perform or invoke a specific action depending on the user input (i.e., entity and intent). The action may include providing a response (or an alert) to a knowledge-seeking or contextual awareness question with respect to a specific entity (e.g., a malware). The action may also include execution of an automation-based action for incident response and proactive operation, for example checking an email for phishing, analyzing a particular Internet protocol (IP) address, analyzing a ticket (from a ticketing system) of one or more threat incidents, determining threats that are targeting an organization, performing a simulation against a threat, etc.

Analysis and context logic 204 may retrieve or receive information from data store 223 and/or use predictive/behavioral models 222 to perform analytics based on the invoked action. For example, if the user input is "Am I at risk from Ransomware?" analysis and context logic 204 may search database 221 for the active Ransomware targeting user's industry and geo-location then analyzing if the user has simulated those attack or if there are any alerts seem for these ransomware attacks within their organization. In another example, if the user input is "What should I be concerned about?", analysis and context logic 204 may use models 222 (which may include trained skill sets) to analyze and determine the threats targeting the organization and their detection rate and then respond with an answer. In yet another example, if the user input is "Analyze 47.204.55.229", analysis and context logic 204 may use information from database 221 and/or models 222 to retrieve details for the IP address 47.204.55.229 to determine what vulnerabilities are unpatched for this IP address, etc.

As previously described, machine learning engine 113 generates responses using analytics and trains itself via algorithms and/or predictive models 222 (e.g., deep learning architectures such as, for example, but not limited to, one or more of deep neural networks, convolutional deep neural networks, deep belief networks, recurrent neural networks, etc.) to learn and determine the behavior of the user. User interface engine 114 is configured to allow a user to interact with cyber awareness and response system 101 via peripheral devices, for example, a keyboard, a touch screen display device, a microphone, a speaker, etc.

Figure 3:
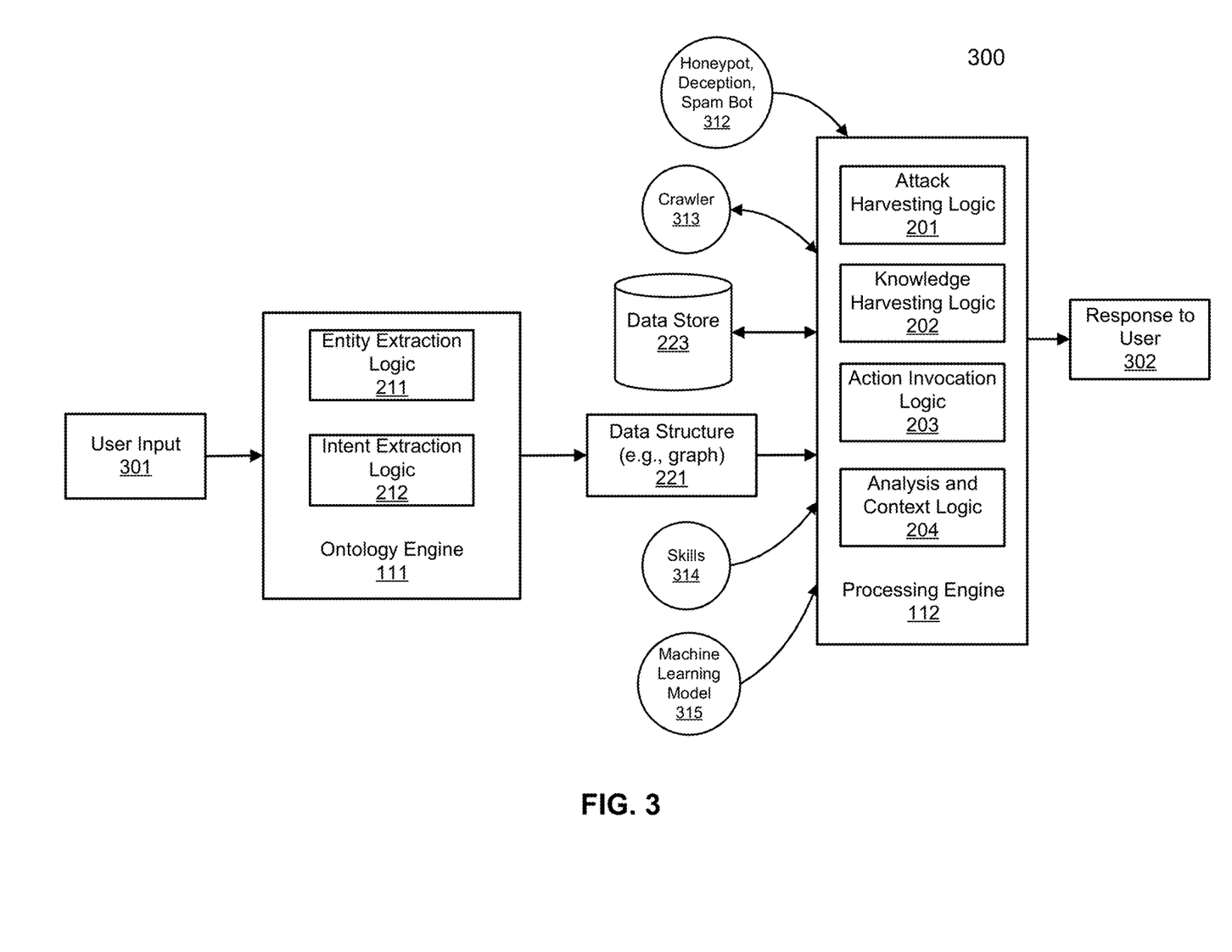
FIG. 3 is a block diagram illustrating an example of an operational flow of the cyber situational awareness and response according to one embodiment.

FIG. 3 is a block diagram illustrating an example of an operational flow of cyber situational awareness and response according to one embodiment. Referring to FIG. 3, operational flow 300 begins with ontology engine 111 receiving a user input 301. As previously described, user input 301 may be a question or a command in the form of a sentence or a paragraph. Entity extraction logic 211 is configured to extract one or many entities (e.g., a noun or pro-noun) and intent extraction logic 212 is configured to extract one or many verbs (e.g., an action to be performed) from the user input 301. The extracted entity and intent may then be used as inputs to traverse data structure 221 in order to determine whether there exists a connection between the extracted entity and intent (as previously described). Alternatively, user input 301 may be specific input data (e.g., an email, a ticket of a threat incident, an incident, a security alert, an event, a user input via text or voice, or any type of data).

As shown, processing engine 112 includes attack harvesting logic 201, knowledge harvesting logic 202, action invocation logic 203, and analysis and context logic 204. Details of logics 201-204 have been previously described, and for brevity sake, will not be described again. In one embodiment, attack harvesting logic 201 may detect attempted attacks from attackers, and collect or harvest information associated with such attacks using cyber-security defense technologies 312, such as honeypot, deception, spam bot, etc. The harvested information associated with attack attempts may be stored in data store 223 for subsequent retrieval.

Knowledge harvesting logic 202 may invoke a crawler 313 (e.g., a spider bot) to systematically browse the Internet and collect any security-related information, for example types of threats, severity of the threats, how the threats can be detected and resolved, etc. This information can also be stored in data store 223 for subsequent access.

Although not shown in FIG. 3, processing engine 112 may include a machine learning engine that trains a set of rules, algorithms, and/or predictive models 315 with security measure skills 314 for responding to or handling security threats. Machine learning model 315 can be trained with any security measure skill set, for example performance of a strike against a threat, alert analysis, incident analysis, IP address analysis, hash/object analysis, URL analysis, etc.

Action invocation logic 203 may perform or invoke a number of actions depending on the user input 301, and provide a response 302 to the user. Response 302 for example may include providing a definition of a type of malicious software (e.g., ransomware), or providing a status or result of the analytics performed by analysis and context logic 204. In one embodiment, the response 302 may also be a question posed to the user in order to learn the user's behavior and the user's need. Using the model 315 and information from database 221, analysis and context logic 204 may perform analytics based on the invoked actions performed by action invocation logic 203.

In one embodiment, the response 302 may include presenting to the user with a list of available security actions based on input data (e.g., an email, a ticket of a threat incident, an incident, a security alert, an event, a user input via text or voice, or any type of data). In some embodiments, response 302 may be a response (or an alert) to a knowledge-seeking or contextual awareness question with respect to a specific entity (e.g., a malware). Response 302 may also include execution of an automation-based action for incident response and proactive operation, for example checking an email for phishing, analyzing a particular Internet protocol (IP) address, analyzing a ticket (from a ticketing system) of one or more threat incidents, determining threats that are targeting an organization, performing a simulation against a threat, etc.

In some embodiments, action invocation logic 203 may provide response 302 differently depending on an operation mode (e.g., self-assist, semi-assist, or full autonomous). In one example, under the self-assist mode, action invocation logic 203 enables a user (e.g., a security administrator) to be in full control in resolving a threat incident. For example, based on certain input data (e.g., an email, a ticket of a threat incident, an incident, a security alert, an event, a user input via text or voice, or any type of data), logic 203 may present the user with a list of available security actions, though the user would manually select (e.g., via user interface engine 114) the specific security action(s) to perform. In another example, under the semi-assist mode, action invocation logic 203 may present to the user with one or more threat incidents, and ask the user whether the user would like to resolve those threat incidents (e.g., via user interface engine 114). In response to determining that the user would like to resolve the threat incidents, action invocation logic 203 may automatically determine and perform the specific security action(s), without the user's involvement, based on available security technologies or products. In yet another example, under the full autonomous mode, action invocation logic 203 may automatically detect and resolve the threat incidents, without any involvement from the user, using the available security technologies or products.

Figure 4:
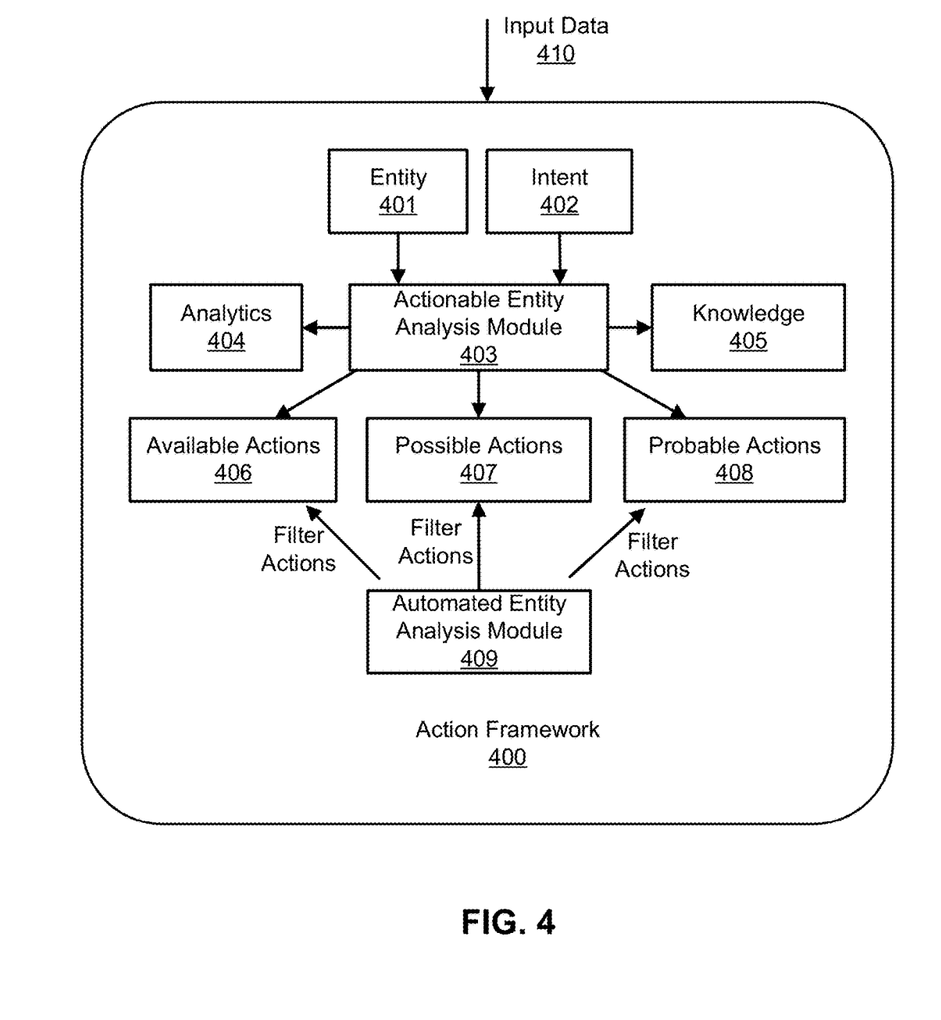
FIG. 4 is a block diagram illustrating an example of an operational flow of an action framework according to one embodiment.

FIG. 4 is a block diagram illustrating an example of an operational flow of an action framework according to one embodiment. In some embodiments, action framework 400 may be performed by action invocation logic 203 of FIG. 2. Referring to FIG. 4, action framework 400 may receive input data 410 initiated by a user via user interface engine 114, or API calls and API responses (as previously described). Input data 410 may be any type of data, such as, for example, an email, a ticket of a threat incident, an incident, a security alert, an event, a user input via text or voice, or any type of data. Based on the input data 410, an entity 401 and intent 402 may be extracted (e.g., by entity extraction logic 211 and intent extraction logic 212, respectively) from input data 410 to determine a course of action. That is, the entity 401 and intent 402 can be a trigger point to perform a specific action (e.g., analytics-based action 404, knowledge-based action 405, or presenting a set of security actions to the user for selection).

Actionable entity analysis module 403 may determine whether the entity 401 is an actionable entity (e.g., an IP address). If so, a number of actions may be presented to the user for selection, such as available actions 406, possible actions 407, and/or probable actions 408. Available actions 406 can be security actions performed by security technologies or products that are available and enabled within an external system (e.g., systems 103-104) to resolve (e.g., eliminate or mitigate) a detected threat on such external system. Possible actions 407 can be security actions performed by security technologies or products that are available within the external system, but are not accessible by (or disabled to) certain users (e.g., a junior-level security administrator) to prevent those users from performing such security actions. For example, based on predictive/behavioral models 222 of FIG. 2, module 403 may learn that certain users do not or should not have access to important security technologies or products. Therefore, the important security technologies are disabled to those users to prevent them from damaging the system (e.g., external systems 103-104). Probable actions 408 can be security actions that are widely used within a specific industry to resolve a particular threat incident, though those security actions may be unavailable within the external system. In some embodiments, probable actions 408 are learned through knowledge harvesting, for example by knowledge harvesting logic 202 of FIG. 2 (as previously described). If entity 401 is not an actionable entity, then action frame 400 may perform analytics-based action 404 (e.g., through analysis and context logic 204) or knowledge-based action 405 (e.g., through knowledge harvesting logic 202) depending on the extracted entity 401 and intent 402.

Automated entity analysis module 409 offers the ability to suppress, prioritize or deprioritize available actions 406, possible actions 407 and/or probable actions 408. Module 409 can be configured to take input from an administrator of the product, a user operating the product, or can automatically apply filtering criteria based on learning from the user's behavior. Based on the determination, module 409 may filter (e.g., enable or disable) some or all of the actions from available actions 406, possible actions 407, and probable actions 408.

To further illustrate the aspects in the described embodiments, referring now to FIGS. 5A-5E, user interface engine 114 may provide the user with a main graphical user interface (GUI) 500. The user may input a command (e.g., "show service now tickets") in text field 511 of GUI 500. Entity extraction logic 211 may parse the command to extract a noun or a pro-noun, which may be predetermined as an entity, from the sentence or paragraph. In the example of the command "show service now tickets", the entities would be "service now" and "tickets". Moreover, intent extraction logic 212 may parse the user input to extract a verb from the sentence or paragraph. An intent may represent an action to be performed by system 101 and it can be classified into different types, for example knowledge, contextual awareness, and automation. In the example of the command "show service now tickets" described above, the term "show" may be determined by logic 212 as an automation intent. Based on the extracted entities (i.e., "service now", "tickets") and intent (i.e., "show") in this particular example, action framework 400 may receive or retrieve one or more tickets of threat incidents (as input data 410) from a ticketing system in response to the user command requesting the showing of the tickets. Ticket information of the tickets (e.g., ticket identifier (ID), description of event, date of event, caller, priority, etc.) may be presented to the user in GUI portion 503 of FIG. 5A.

Figure 5A:
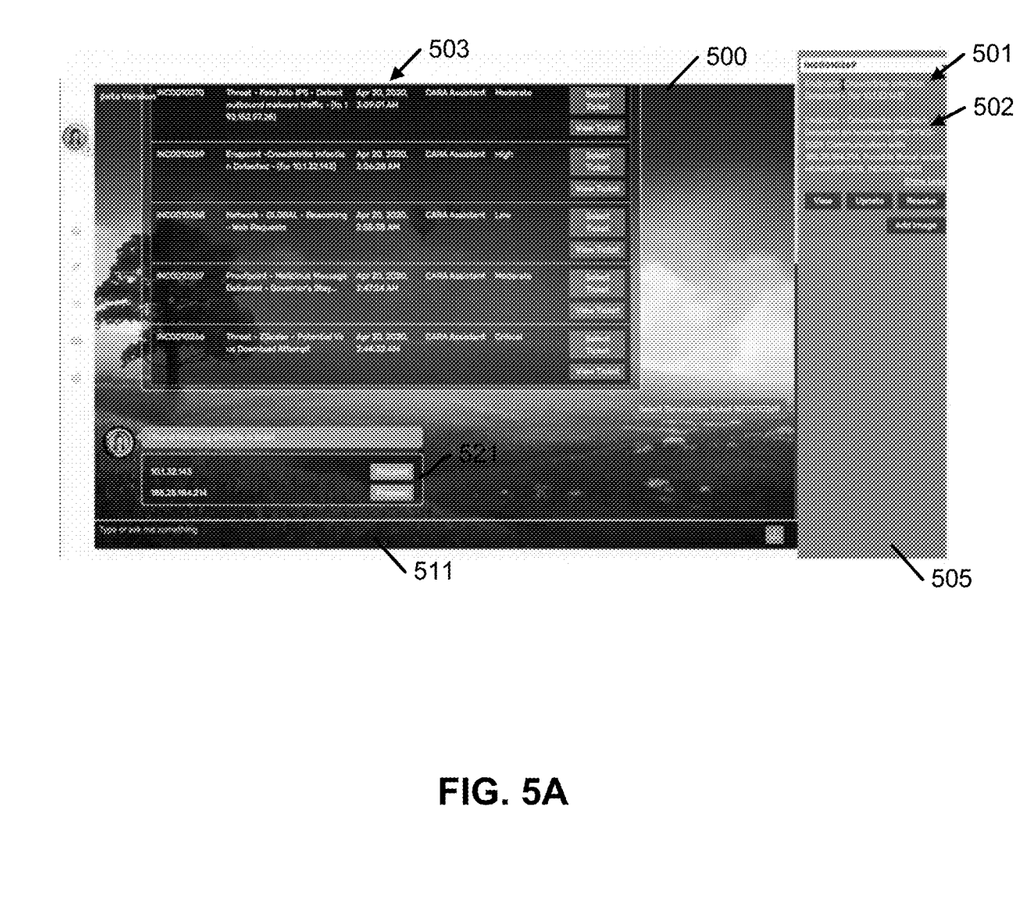
FIGS. 5A-5E are examples of user interfaces for a user to interact with the cyber situational awareness and response system according to one embodiment.

When the user selects a specific ticket (e.g., a ticket having a ticket ID "INC0010269") by clicking on the corresponding "Select Ticket" button, event information 501-502 of the selected ticket may be populated in GUI portion 505. Alternatively, instead of clicking on the "Select Ticket" button, the user may input a select command (e.g., "Select ServiceNow ticket INC0010269") in text field 511. In this example, event information 501-502 may include, but not limited to, endpoint information, one or more IP addresses, hostname, possible threat actors, etc.

Figure 5B:
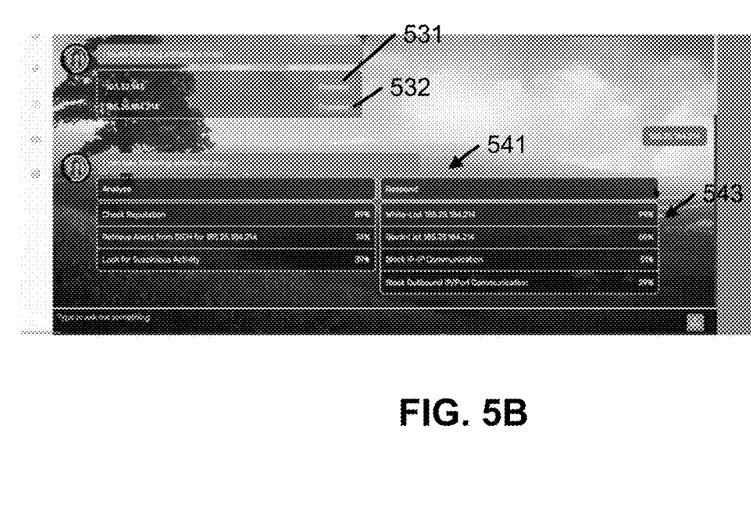
Figure 5C:
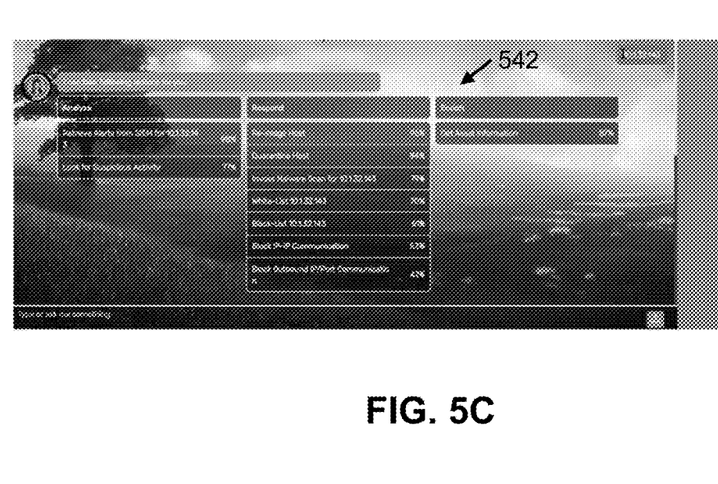
Figure 5D:
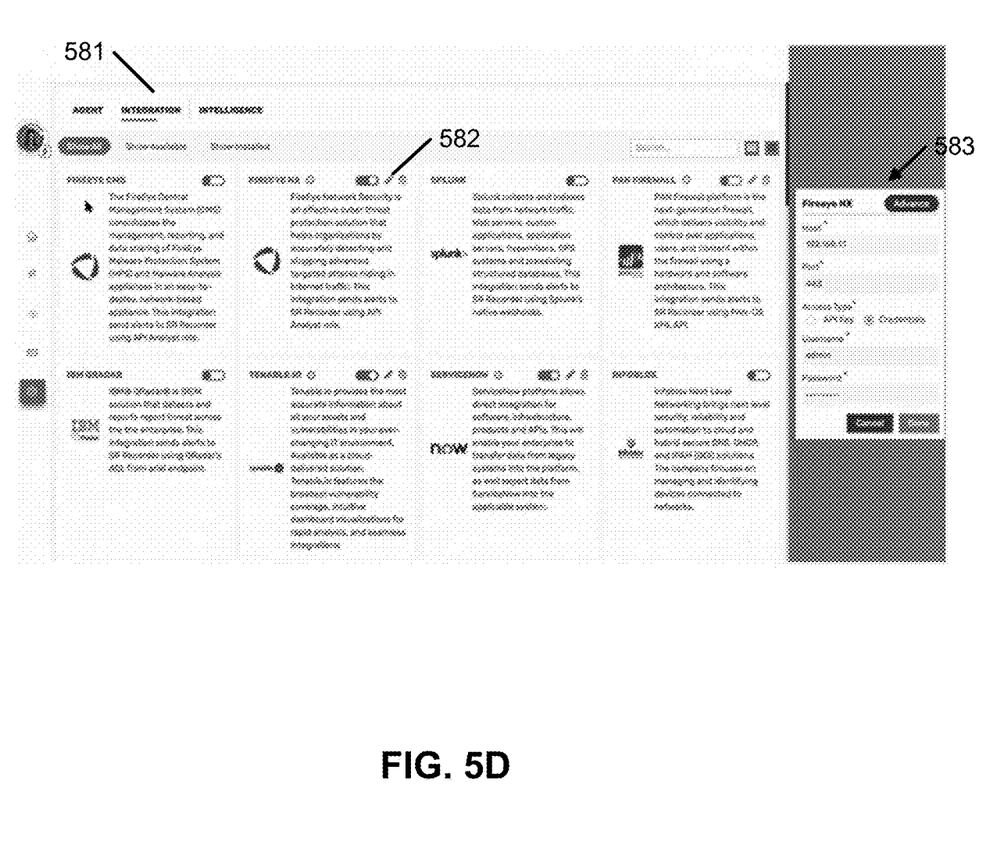

Based on event information 501-502, a number of entities can be extracted, for example by entity extraction logic 211. In the example shown in FIG. 5A, the extracted entities can include "Crowdstrike", "10.1.32.143", "hostname", "SMG-FWD-2021, "185.25.184.214", "MUMMYSPIDER", "INDRKSPIDER", etc. Based on the extracted entities, one or more actionable entities can be determined (e.g., by actionable entity analysis module 403 of FIG. 4) based on predetermined actionable entities. In the example shown in FIG. 5A, the actionable entities are the two IP addresses "10.1.32.143" and "185.25.184.214". The actionable items are also presented in a list of artifacts 521 in response to the user input requesting the showing of the tickets. Referring now to FIGS. 5B-5C, once the "Proceed" button 531/532 corresponding to an IP address (e.g., 185.25.184.214) is clicked on, system 101 may present the user with different lists of available security actions 541-542, respectively. Security actions 541-542 may correspond to available actions 406, possible actions 407, and/or probably actions 408 of FIG. 4. Here, system 101 interactively guides the user by recognizing that the IP address 185.25.184.214 is external to the environment while the IP address 10.1.32.143 is internal to the environment. As such, system 101 provides a first list of available security actions 541 for the IP address 185.25.184.214, and a second list of available security actions 542 for the IP address 10.1.32.143.

As also shown in FIGS. 5B-5C, each available security action has a corresponding confidence score (e.g., confidence score 543), which may be in the form of a percentage, or other information indicative of a confidence indication. The confidence scores are useful to a user as they provide the user with a range of actions indicating from the one that is mostly selected to the one that is least selected, though the user is free to select the available security actions in any order as desired.

Although not shown in FIGS. 5B-5C, in some embodiments, some of available security actions 541-542 may be disabled (e.g., grayed out and not selectable by the user), for example by automated entity analysis module 409 of FIG. 4. Otherwise, if the available security actions 541-542 are enabled for selection, they may be presented in the transparent form, as shown in FIGS. 5B-5C, or may have color bands (not shown in the figures) to display which action(s) is/are serving them (e.g. available actions 406, possible actions 407 or probable actions 408). Moreover, the available security actions 541-542 are presented and can be dynamically updated in main GUI 500, for example, based on the filter actions as determined by automated entity analysis module 409.

In some embodiments, when the user selects a specific available security action (e.g., "Re-Image Host"), the user may be required to input their credentials for verification. In that regard, referring to FIG. 5D, the user may select an "Integration" tab 581, click on an edit button 582, and input their credentials (e.g., Username, Password) in credential GUI 583. In some embodiments, the available actions 406 of FIG. 4 are presented based on the available and enabled security technologies or products (e.g., FireEye CHS, FireEye NX, Splunk, Pan Firewall, SeviceNow, etc.) shown in tab 581. Also, the possible actions 407 may be presented based on the input user credentials in GUI 583. For example, a security administrator may preset access control rules to limit each user's access of the security technologies or products. Thus, when the user logs in using the user's credentials, the credentials may be used to disable some of the security technologies or products that are inaccessible to the user.

Figure 5E:
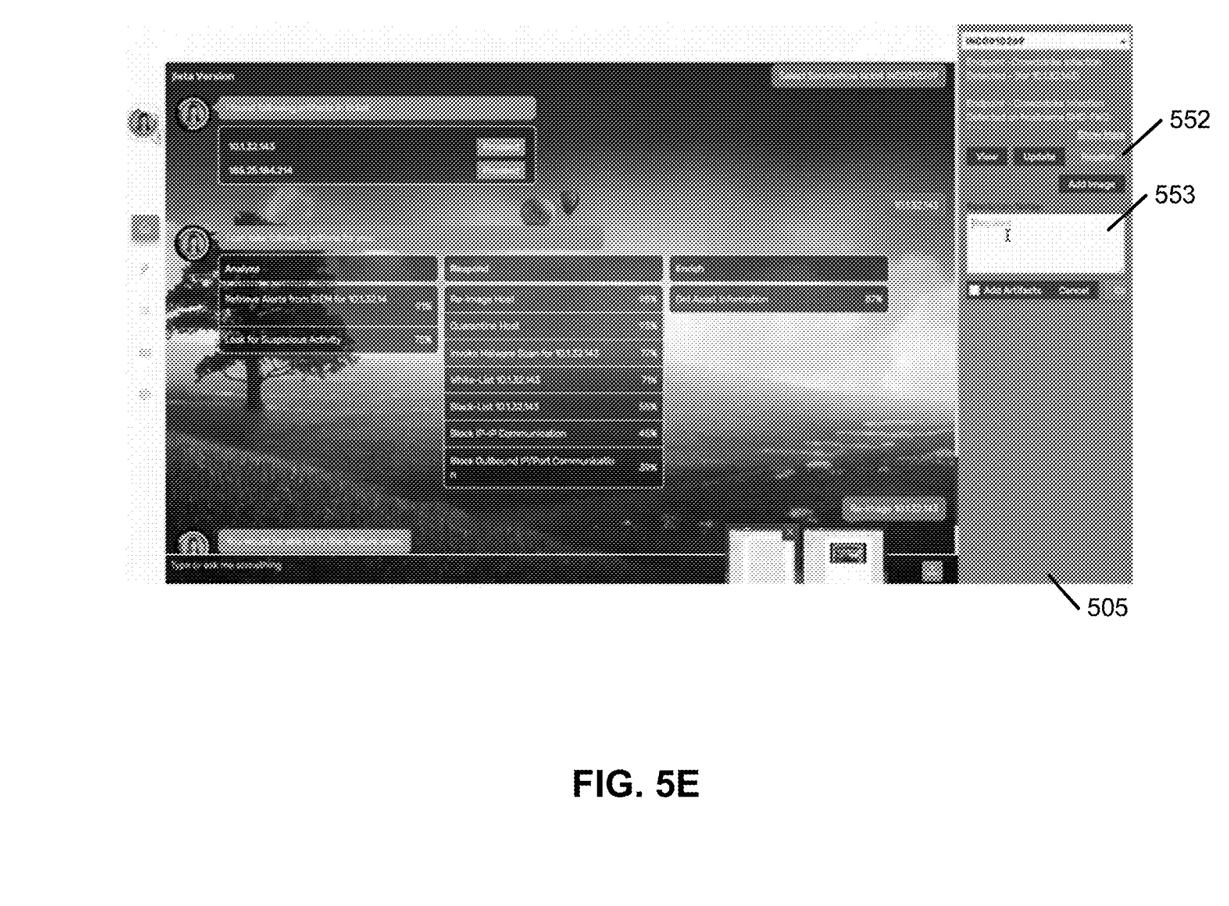

After selecting the available security action, an API may be invoked to allow applications and/or services to perform the selected action. Once the selected action is complete and the ticket is resolved, the user may click on "Resolve" button 552 in GUI 505 and input resolution notes 553 (FIG. 5E).

It is noted that while action invocation logic 203 of FIG. 3 may provide the response 302 via a graphical element (e.g., GUI 500), as previously described, in other embodiments the response 302 may be provided through voice interaction (e.g., using at least one speaker coupled to cyber situational awareness and response system 101). For example, any information provided as part of response 302, such as the list of available security actions including available actions 406, possible actions 407, and/or probable actions 408, can be communicated to a user via voice interaction.

Figure 6:
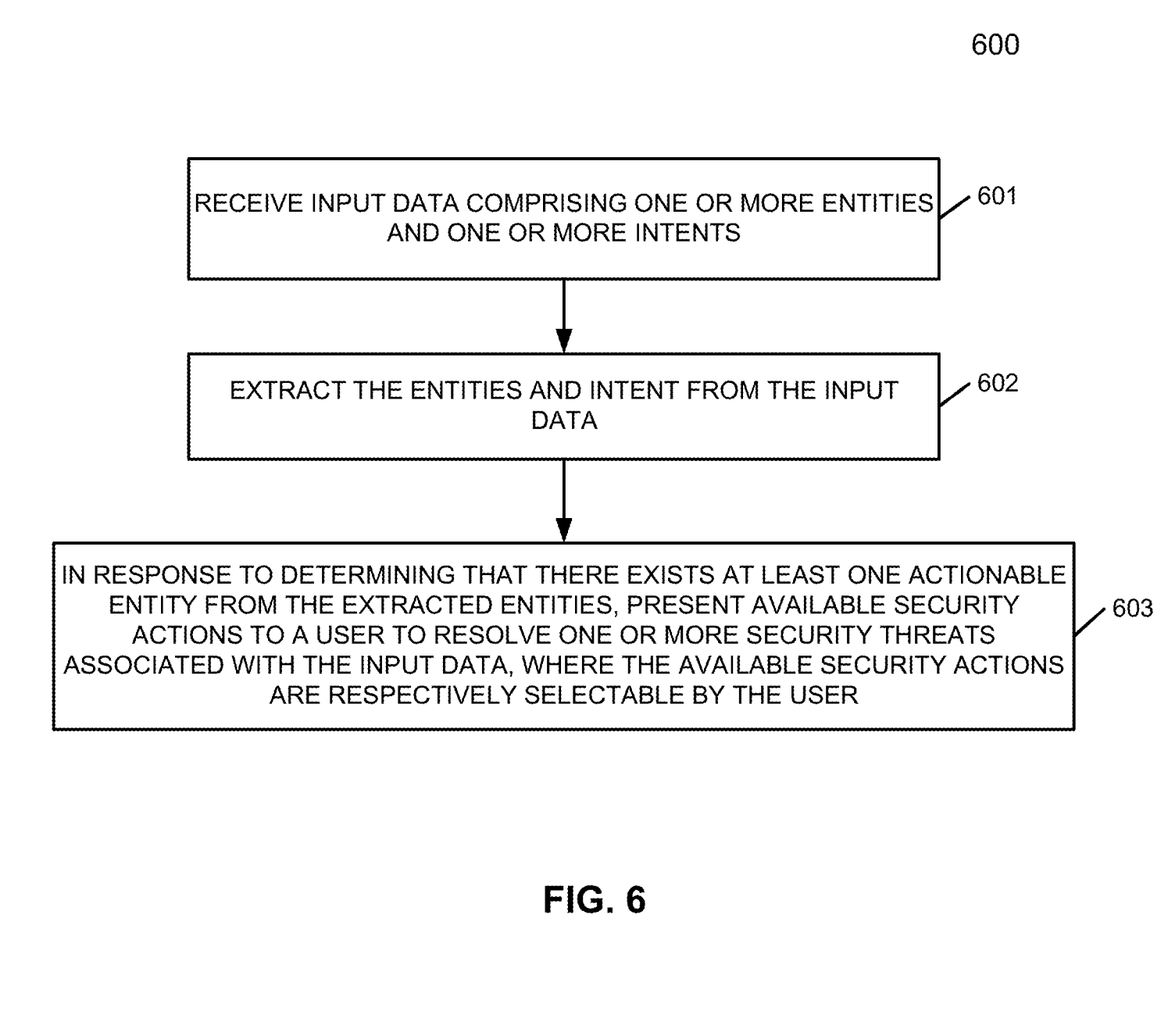
FIG. 6 is a flow diagram illustrating a process of providing automated actions in handling security threats according to one embodiment.

FIG. 6 is a flow diagram illustrating a process of providing automated actions in handling security threats according to one embodiment. Process 600 may be performed by processing logic which may include software, hardware, firmware, or a combination thereof. For example, process 600 may be performed by cyber situational awareness and response system 101 of FIG. 1.

Referring to FIG. 6, at block 601, input data is received where the input data comprises one or more entities (e.g., nouns or pronouns) and one or more intents (e.g., verbs). At block 602, the entities and the intents are extracted from the input data. At block 603, in response to determining that there exists at least one actionable entity from the extracted entities, a plurality of available security actions are presented to a user to resolve one or more security threats associated with the input data, where the available security actions are respectively selectable by the user.

Note that some or all of the components as shown and described above (e.g., components 111-114) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
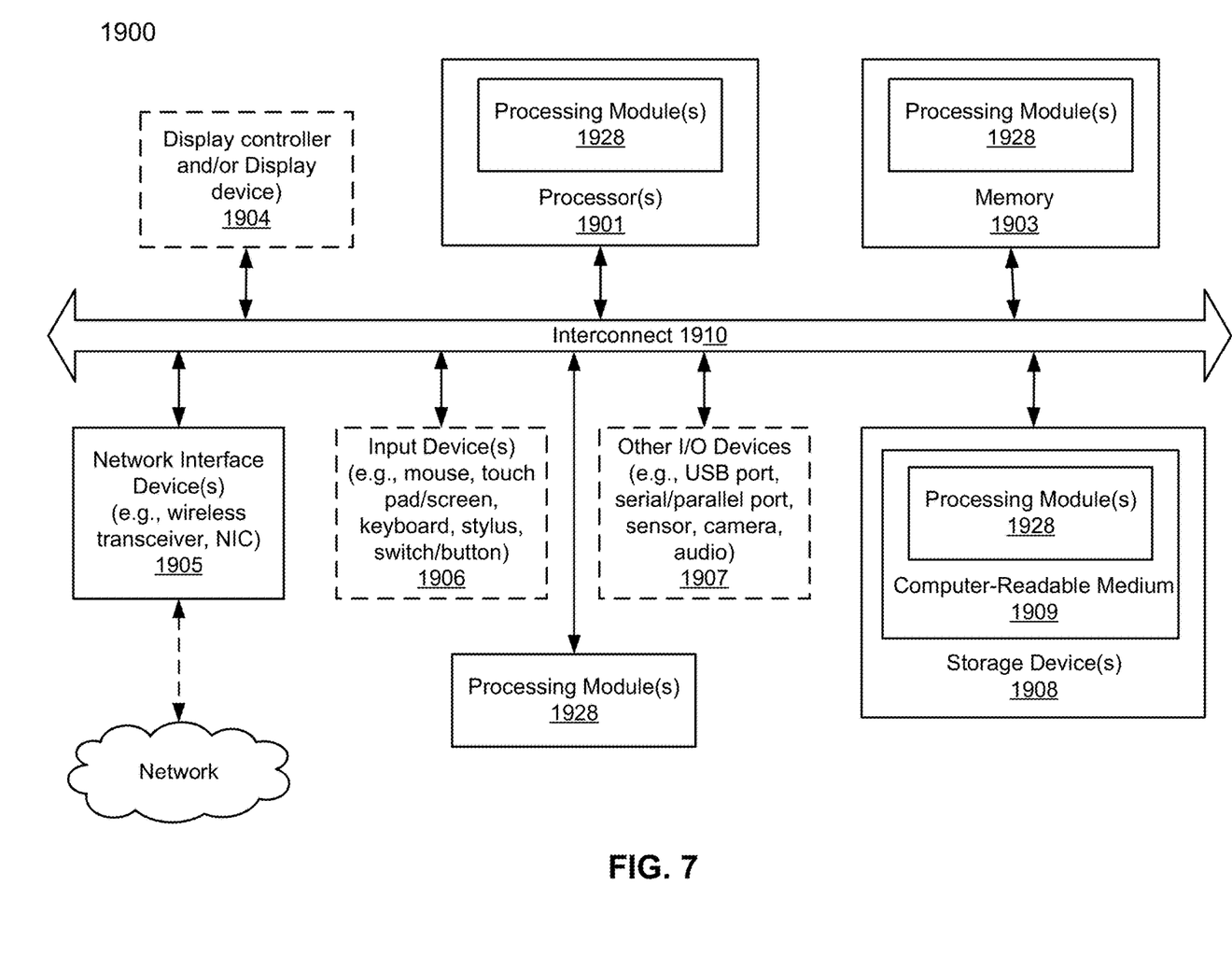
FIG. 7 is a block diagram illustrating a data processing system according to one embodiment.

FIG. 7 is a block diagram illustrating an example of a data processing system which may be used with one embodiment of the invention. For example, system 1900 may represent any of data processing systems described above performing any of the processes or methods described above, such as, for example, cyber situational awareness and response system 101 or any of external systems 103-104 of FIG. 1. System 1900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1900 is intended to show a high level view of many components of the computer system. However, it is to be understood that additional components may be present in certain implementations and furthermore, different arrangement of the components shown may occur in other implementations. System 1900 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1900 includes processor 1901, memory 1903, and devices 1905-1908 via a bus or an interconnect 1910. Processor 1901 may represent a single processor or multiple processors with a single processor core or multiple processor cores included therein. Processor 1901 may represent one or more general-purpose processors such as a microprocessor, a central processing unit (CPU), or the like. More particularly, processor 1901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1901, which may be a low power multi-core processor socket such as an ultra-low voltage processor, may act as a main processing unit and central hub for communication with the various components of the system. Such processor can be implemented as a system on chip (SoC). Processor 1901 is configured to execute instructions for performing the operations and steps discussed herein. System 1900 may further include a graphics interface that communicates with optional graphics subsystem 1904, which may include a display controller, a graphics processor, and/or a display device.

Processor 1901 may communicate with memory 1903, which in one embodiment can be implemented via multiple memory devices to provide for a given amount of system memory. Memory 1903 may include one or more volatile storage (or memory) devices such as random access memory (RAM), dynamic RAM (DRAM), synchronous DRAM (SDRAM), static RAM (SRAM), or other types of storage devices. Memory 1903 may store information including sequences of instructions that are executed by processor 1901, or any other device. For example, executable code and/or data of a variety of operating systems, device drivers, firmware (e.g., input output basic system or BIOS), and/or applications can be loaded in memory 1903 and executed by processor 1901. An operating system can be any kind of operating systems, such as, for example, Robot Operating System (ROS), Windows® operating system from Microsoft®, Mac OS/iOS from Apple, Android® from Google®, LINUX, UNIX, or other real-time or embedded operating systems.

System 1900 may further include IO devices such as devices 1905-1908, including network interface device(s) 1905, optional input device(s) 1906, and other optional IO device(s) 1907. Network interface device 1905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1906 may include a mouse, a touch pad, a touch sensitive screen (which may be integrated with display device 1904), a pointer device such as a stylus, and/or a keyboard (e.g., physical keyboard or a virtual keyboard displayed as part of a touch sensitive screen). For example, input device 1906 may include a touch screen controller coupled to a touch screen. The touch screen and touch screen controller can, for example, detect contact and movement or break thereof using any of one or more touch sensitivity technologies, including but not limited to capacitive, resistive, infrared, and surface acoustic wave technologies, as well as other proximity sensor arrays or other elements for determining one or more points of contact with the touch screen.

IO devices 1907 may include an audio device. An audio device may include a speaker and/or a microphone to facilitate voice-enabled functions, such as voice recognition, voice replication, digital recording, and/or telephony functions. Other IO devices 1907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1910 via a sensor hub (not shown), while other devices such as a keyboard or thermal sensor may be controlled by an embedded controller (not shown), dependent upon the specific configuration or design of system 1900.

To provide for persistent storage of information such as data, applications, one or more operating systems and so forth, a mass storage (not shown) may also couple to processor 1901. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1901, e.g., via a serial peripheral interface (SPI). This flash device may provide for non-volatile storage of system software, including BIOS as well as other firmware of the system.

Storage device 1908 may include computer-accessible storage medium 1909 (also known as a machine-readable storage medium or a computer-readable medium) on which is stored one or more sets of instructions or software (e.g., module, unit, and/or logic 1928) embodying any one or more of the methodologies or functions described herein. Processing module/unit/logic 1928 may represent any of the components described above, such as, for example, any of the engines 111-114 (alone or in combination). Processing module/unit/logic 1928 may also reside, completely or at least partially, within memory 1903 and/or within processor 1901 during execution thereof by data processing system 1900, memory 1903 and processor 1901 also constituting machine-accessible storage media. Processing module/unit/logic 1928 may further be transmitted or received over a network via network interface device 1905.

Computer-readable storage medium 1909 may also be used to store some software functionalities described above persistently. While computer-readable storage medium 1909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1928, components and other features described herein can be implemented as discrete hardware components or integrated in the functionality of hardware components such as ASICS, FPGAs, DSPs or similar devices. In addition, processing module/unit/logic 1928 can be implemented as firmware or functional circuitry within hardware devices. Further, processing module/unit/logic 1928 can be implemented in any combination hardware devices and software components.

Note that while system 1900 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that includes hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for providing automated actions in handling security threats, the method comprising:
   receiving input data comprising one or more entities and one or more intents;
   extracting the entities and the intents from the input data;
   traversing a data structure to determine whether there exists a connection between the extracted entities and the extracted intents, wherein the connection automatically triggers invocation of at least one specific action; and in response to determining that there exists a connection between the extracted entities and the extracted intents, invoking the at least one specific action comprising:

presenting a plurality of available security actions to a user to resolve one or more security threats associated with the input data when there exists at least one actionable entity from the extracted entities, the available security actions being respectively selectable by the user;

presenting to the user respective confidence scores associated with the plurality of available security actions, wherein the confidence scores correspond with a range of security actions among the plurality of available security actions ranging from a mostly selected security action to a least selected security action;

in response to selecting an available security action by the user, automating a performance of the selected security action, without the user's input, to resolve the one or more security threats; and dynamically updating the presented available security actions.

2. The computer-implemented method of claim 1, wherein automating the performance of the selected security action comprises automatically invoking a security product to resolve the one or more security threats.

3. The computer-implemented method of claim 1, wherein dynamically updating the presented available security actions comprises: disabling some of the available security actions based on the user's role, wherein the disabled security actions are preset to be inaccessible to the user.

4. The computer-implemented method of claim 1, wherein dynamically updating the presented available security actions comprises: disabling some of the available security actions based on a predictive model trained with the user's historical behavior in selecting past security actions to resolve prior input data.

5. The computer-implemented method of claim 1, wherein the at least one specific action further comprises performing a knowledge-based action or an analytics-based action when there is no actionable entity from the extracted entities.

6. The computer-implemented method of claim 1, wherein the plurality of available security actions comprise at least one of: available actions, possible actions, or probable actions.

7. The computer-implemented method of claim 1, wherein the input data is provided by the user through a graphical user interface.

8. The computer-implemented method of claim 1, wherein the plurality of available security actions are performed by security products that are enabled under integration.

9. A data processing system, comprising:
a processor; and
a memory coupled to the processor to store instructions, which when executed by the processor, cause the processor to perform operations, the operations including:

receiving input data comprising one or more entities and one or more intents;

extracting the entities and the intents from the input data;

traversing a data structure to determine whether there exists a connection between the extracted entities and the extracted intents, wherein the connection automatically triggers invocation of at least one specific action; and in response to determining that there exists a connection between the extracted entities and the extracted intents, invoking the at least one specific action comprising:

presenting a plurality of available security actions to a user to resolve one or more security threats associated with the input data, the available security actions being respectively selectable by the user;

presenting to the user respective confidence scores associated with the plurality of available security actions, wherein the confidence scores correspond with a range of security actions among the plurality of available security actions ranging from a mostly selected security action to a least selected security action;

in response to selecting an available security action by the user, automating a performance of the selected security action, without the user's input, to resolve the one or more security threats; and dynamically updating the presented available security actions.

10. The data processing system of claim 9, wherein automating the performance of the selected security action comprises automatically invoking a security product to resolve the one or more security threats.

11. The data processing system of claim 9, wherein dynamically updating the presented available security actions comprises disabling some of the available security actions based on the user's role, wherein the disabled security actions are preset to be inaccessible to the user.

12. The data processing system of claim 9, wherein dynamically updating the presented available security actions comprises disabling some of the available security actions based on a predictive model trained with the user's historical behavior in selecting past security actions to resolve prior input data.

13. The data processing system of claim 9, wherein the at least one specific action further comprises performing a knowledge-based action or an analytics-based action when there is no actionable entity from the extracted entities.

14. The data processing system of claim 9, wherein the plurality of available security actions comprise at least one of: available actions, possible actions, or probable actions.

15. The data processing system of claim 9, wherein the input data is provided by the user through a graphical user interface.

16. The data processing system of claim 9, wherein the plurality of available security actions are performed by security technologies or products that are enabled under integration.

* * * * *